Sept. 18, 1956      E. C. HORTON      2,763,023
WINDSHIELD CLEARING SYSTEM
Filed Feb. 16, 1952
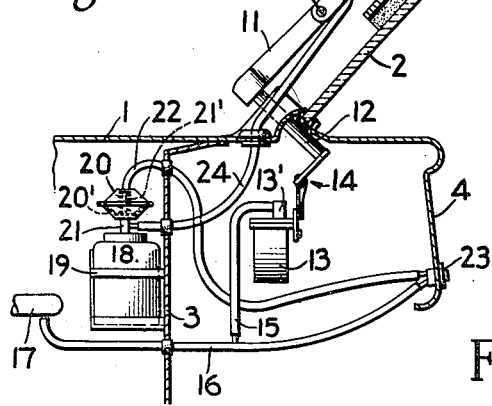
INVENTOR.
ERWIN C. HORTON
BY
ATTORNEYS
Beau, Brooks, Buckley & Bean United States Patent Office 2,763,023
Patented Sept. 18, 1956

2,763,023

WINDSHIELD CLEARING SYSTEM

Erwin C. Horton, Hamburg, N. Y., assignor to Trico Products Corporation, Buffalo, N. Y.

Application February 16, 1952, Serial No. 271,921

26 Claims. (Cl. 15—250.4)

This invention relates generally to the window clearing art, and more particularly to a system providing a combined washing and wiping action for clearing dirt and other such accumulation from vehicle windshields.

Prior art installations of this general type possess several disadvantages. For example, in many such installations the clearing fluid is continuously sprayed onto the windshield from a position adjacent one edge thereof, thereby tending to completely obstruct the vehicle operator's vision through the windshield. In others, a relatively complicated and cumbersome wiper arm and blade assembly is required. These and other disadvantages are overcome by the instant invention.

It is an object of the instant invention to provide a window clearing installation having directive control of the delivery of clearing fluid to the window.

Another object of the instant invention is to provide a windshield clearing system which delivers clearing fluid to the windshield only in front of the moving blade in each direction of movement.

In addition, it is an object of the instant invention to provide a windshield clearing installation including means directing clearing fluid only forwardly of the wiper blade along its direction of movement, which means are automatically operable at the conclusion of each wiping stroke in either direction to direct clearing fluid to the windshield on the opposite side of the wiper blade.

A further object of the instant invention is to provide a windshield clearing system including valve means directing clearing fluid first to one side and then the other of the wiper blade, which valve means are responsive to the combined forces of gravity and inertia upon wiper arm reversal to automatically direct the clearing fluid only to the forward side of the wiper blade.

Another object of the instant invention is to provide a windshield clearing installation wherein the clearing fluid is delivered to the windshield from a point closely adjacent the windshield area to be cleared.

A further object of the instant invention is to provide a windshield clearing apparatus wherein the clearing fluid discharge means is incorporated into the moving wiper arm.

It is also an object of the instant invention to provide a windshield clearing assembly having the aforesaid characteristics and which is relatively simple in construction, completely reliable in operation, and which provides an absolute minimum of obstruction to vision through the windshield.

The foregoing and other objects will become apparent upon an understanding of the ensuing detailed description, taken together with the accompanying drawing wherein:

Fig. 1 is a view of the entire windshield clearing system of the instant invention installed in place on a vehicle;

Fig. 2 is a fragmentary plan view of the wiper blade and arm of Fig. 1 showing the clearing fluid discharge and valve means in details, and with certain parts in section for greater clarity;

Fig. 3 is a detail view taken along line III—III of Fig. 2;

Fig. 4 is a detail view similar to Fig. 2 but showing a slightly modified form of washing fluid discharge means;

Fig. 5 is a view similar to Fig. 1 but showing the washing fluid discharge means thereof located in a different position along the wiper arm;

Fig. 6 is a detail view similar to Fig. 2 but showing another modified form of washing fluid discharge and valve means; and Fig. 7 is a detail view similar to Fig. 2 but showing another slightly modified form of washing fluid discharge and valve means.

The windshield clearing system of the instant invention is shown in Fig. 1 installed on a vehicle 1 having a windshield 2, a firewall 3, and an instrument panel 4, and includes a wiper blade comprising, for example, a wiping element 5 carried by a yoke assembly 6 having an attaching member 7. Member 7 is connected to a wiper arm 8, being carried at the outer end of the outer section 9 of arm 8, the inner end of said section being pivotally connected at 10 to an inner mounting section 11. Section 11 of arm 8 is mounted on the outer end of rockshaft 12, which rockshaft is journaled in the cowl of vehicle 1 in a conventional manner.

A conventional suction operated wiper motor 13 is connected to rockshaft 12 by conventional linkage generally designated 14 for oscillating the wiper blade across the surface of windshield 2 through a predetermined path, all in a manner well known in the art. Wiper motor 13 is also provided with an exhaust or suction conduit 15 communicating with another suction conduit 16 which in turn communicates with a source of suction such as the intake manifold 17 of vehicle 1. Motor 13 has a control valve 13' which may be actuated in a known manner to cause either running or parking of the wiper blade.

A reservoir 18 containing clearing fluid is carried by vehicle 1, as by means of a bracket 19 mounted on the forward side of firewall 3, and a fluid pump 20 communicates therewith through a conduit 21.

Pump 20 is of a kind known in the art, and preferably is a fluid actuated pump including a reciprocable wall 20' in the form of a diaphragm or piston operable on an intake stroke induced by pressure differential to draw a charge of fluid from reservoir 18 through conduit 21 and into pump 20, said wall have a reverse stroke induced by the backing spring 21' upon release of pressure differential to discharge said charge of fluid through a delivery conduit 24. This type of pump is described, for example, in United States Letters Patent 2,142,056, for a Windshield Clearing System, granted to applicant on December 27, 1938. A suction conduit 22 extends from pump 20 through firewall 3 to a control valve 23 mounted on instrument panel 4, which control valve is adapted to be manually actuated by the operator of the vehicle. Valve 23 also communicates with suction conduit 16, whereby when valve 23 is actuated conduit 22 will be placed in communication with the source of suction 17 to provide a pressure differential across wall 20' causing the same to draw in a charge of fluid as previously described.

Fluid delivery conduit 24 extends from conduit 21 through firewall 3 and the cowl of vehicle 1 to wiper arm 8. As is clearly apparent from an inspection of Fig. 1, the outer section 9 of arm 8 is of inverted U-shape in cross section whereby to provide side wall portions as illustrated at 25, and conduit 24 fits between the side wall portions of section 9 and extends therealong from adjacent pivot point 10 to the outer end thereof. Conduit 24 is retained between the side wall members of arm section 9 in any conventional and desired manner, and of course said arm section can alternatively be arched or cupped or otherwise shaped, the desired result being to enclose and protect conduit 24 and to provide a neat appearance. A fluid discharge member 26 is mounted adjacent the outer end of arm section 9, being secured thereto as by screw means 27, or any other conventional means. If desired, member 26 can be formed integral with arm section 9. Also, the side wall portions of section 9 are broken away to permit member 26 to extend there beyond.

Referring now to Fig. 2, member 26 is seen to comprise a transversely elongate member having a central chamber 28 communicating at the inner side thereof with a fluid inlet passage 29 and at its opposite ends with fluid outlet chambers 30 and 31. Delivery conduit 24 communicates with inlet passage 29. Valve seats 32 and 33 are provided between chamber 28 and chambers 30 and 31, respectively, and chambers 30 and 31 are provided with fluid outlet means 34 and 35, respectively. Said fluid outlets are directed downwardly and outwardly toward the windshield and forwardly along the wiper blade. Also, a ball valve 36 is enclosed within chamber 28 for movement from one end thereof to the other to alternately engage valve seats 32 and 33.

The operation of this invention is as follows. Assume that the wiper blade is in its parked position adjacent the lower edge of windshield 2, with arm 8 directed toward the center of said windshield. When it is desired to clear the windshield of dirt and other accumulations thereon, valve 23 is actuated by the operator of the vehicle to place pump 20 in communication with the source of suction 17 through conduits 22 and 16, causing an intake stroke of member 20' to draw a predetermined amount of clearing fluid, such as water, into pump 20. Upon release of valve 23, the reverse stroke of member 20' causes this fluid to be discharged by pump 20 into delivery conduit 24, and from thence to discharge member 26 and windshield 2. Appropriate check valve means, not illustrated, prevent return of this fluid to reservoir 18, as described in the aforesaid Patent No. 2,142,056. Simultaneously, wiper motor 13 is energized in a conventional manner to oscillate the wiper blade across windshield 2.

When the wiper blade is in said parked position, ball valve 36 is held by gravity against valve seat 32, closing outlet 34, and consequently the washing fluid will be delivered from conduit 24 through passage 29, chamber 28, chamber 31, and outlet 35, issuing therefrom as a jet. Outlet 35 directs the washing fluid onto windshield 2 in advance of the moving wiper blade along its direction of travel, which in this case will be upward. As the wiper blade swings upwardly, valve 36 will be held on valve seat 32 by the combined forces of gravity, inertia, and the pressure of the washing fluid thereagainst, and clearing fluid will continue to issue only from outlet 35.

However, outlets 34 and 35 are of relatively large diameter, whereby there will not be much fluid pressure on the system, and the ball valve is relatively heavy, whereby as the wiper arm 8 reverses its direction of movement at the end of the wiping stroke, the inertia and gravitational position of said ball valve will overcome the fluid pressure acting thereon to cause valve 36 to leave valve seat 32 and engage valve seat 33, and the washing fluid will then be delivered to windshield 2 through jet 34 during the wiping stroke in the opposite direction, as illustrated in Fig. 2 wherein the direction of movement is shown by the arrow. Thus, the fluid discharge valve is automatically reversed by reason of its gravitational position and the inertia thereof at each reversal in the direction of movement of the wiper arm, whereby the washing fluid is delivered to windshield 2 only in advance of the wiper blade along its direction of movement, and the clearing or washing fluid is so applied during movement of the wiper blade in each direction. With this construction, the washing fluid applied to the windshield is immediately caught by the wiper blade whereby to reduce to a minimum any impairment of vision through windshield 2 by the application of clearing fluid thereto. Thus, there is provided a highly directive control of fluid delivery. Also, as ball valve 36 moves from one valve seat to the other upon wiper arm reversal, it functions with a plunger action tending to force the remaining fluid issuing from the outlet being closed through said outlet with a positive action for clearing the same.

It should be noted that outlets 34 and 35 are each directed far enough in advance of the moving wiper blade so that the fluid will reach a given point on the windshield before the wiper blade reaches said point when traveling at its highest speed, whereby the fluid will always be immediately wiped from the windshield without the necessity of awaiting the next stroke of the wiper blade. Also, the provision of relatively low fluid pressure is satisfactory in the system of the instant invention because the washing fluid is delivered to the windshield from a point closely adjacent the area of the windshield which is to be cleared, and is not projected onto the windshield from the cowl of the vehicle or some other equally remote point. The washing fluid applied to the windshield is spread outwardly by wind and centrifugal action, and inwardly toward the rockshaft by gravity and to some extent by the eddy-whirl action of the wind, whereby complete washing of the wiping area or areas to be cleared is obtained.

It should be noted that the outer wall 37 of chamber 28 is flat, whereby said chamber is D-shaped in transverse section, as clearly shown in Fig. 3. Wall 37 bears against ball valve 36 when the latter is seated on either of valve seats 32 and 33, whereby said ball valve is prevented from moving outwardly under the influence of centrifugal force.

Should it be found either desirable or necessary, a further aid in the distribution of the clearing fluid can be obtained by the modification shown in Fig. 4. In this construction, everything remains the same as in the system of Fig. 2, except that one of the outlets 34 is directed outwardly along one side of the wiper blade, and the other outlet 35' is directed inwardly along the other side of the wiper blade. In this way, complete and adequate coverage of the entire wiping area is insured, and the valve is automatically reversed upon wiper arm reversal as previously described.

A further modification of the instant invention which may be preferable in certain installation is illustrated in Fig. 5, wherein the construction remains the same as in Fig. 2 except that member 26 is located adjacent the inner or lower end of the wiper blade. In this embodiment, the washing fluid is delivered to windshield 2 at points adjacent the inner end of the wiper blade and is spread outwardly by wind and centrifugal action to cover the entire area to be cleared. The valve action remains the same as that described in connection with the system of Fig. 2.

Still another modification of the instant invention is illustrated in Fig. 6, wherein there is illustrated a different discharge member and valve construction although the operating principle and the inventive concept remain the same. In the modification of Fig. 6, outer section 9 of wiper arm 8 is divided into an inner part 9' and an outer part 9" secured thereto by a vertical pivot 37', whereby said outer part is movable about said pivot. The fluid discharge member 38 is formed integral with part 9', and provides a curved front portion for said arm part. Member 38 is provided with fluid outlet passages 39 and 40 extending therethrough and directed toward the windshield and outwardly along opposite sides of the wiper blade. At their inner ends, said outlets join with a fluid delivery passage 29' which in turn will communicate with delivery conduit 24. The inner end of arm part 9" is curved to complement the outer curved surface of member 38, as at 41, and said inner end 41 serves as a valve means alternately opening and closing outlets 39 and 40 as part 9″ is moved relative to part 9′. Also, part 9′ is provided at each side with a stop member, as illustrated at 42 and 43, whereby to limit the movement of part 9″ relative to part 9′.

Thus, in operation, when the wiper arm is moved in the direction of the arrow in Fig. 6, the inertia of part 9″ causes the same to pivot rearwardly against stop 43, whereby to close outlet 40 and open outlet 39. Thus, clearing fluid is applied to the windshield only in advance of the moving wiper blade, being directed to the windshield at a point sufficiently in advance of the moving blade to insure the application of fluid thereto before the blade reaches said point when moving at its highest speed. Upon reversal of the wiper arm for movement in the opposite direction, the inertia of part 9″ will cause the same to swing rearwardly and abut stop 42 with valve means 41 closing outlet 39 and opening outlet 40. Thus, the inventive concept and the method and principle of operation remain the same, although a different construction of the discharge member and valve means is utilized.

In addition, the movement of wiper arm part 9″ relative to part 9′, to control outlets 39 and 40, also is in response to drag forces on the wiping element 5, whereby the valve action of this modification is not dependent on inertia forces alone. In other words, the torque or driving force needed to overcome blade drag will provide the desired valve action, and will be effective no matter how slowly the wiper is operating.

Fig. 7 shows a further modification similar to the arrangement of Fig. 2 but with valve seats 32′ and 33′ closer together than are valve seats 32 and 33. Thus, valve 36 moves but a slight distance from one valve seat to the other, resembling somewhat a tappet valve, as distinguished from the plunger action of the valve of Fig. 2. In all other respects, the operation of this modification remains the same as that of Fig. 2.

Therefore, the instant invention fully accomplishes its aforesaid objects, and provides a window clearing system having a highly directive control of fluid delivery, with clearing fluid being applied to the window only in advance of the moving wiper blade in either direction of movement, whereby the fluid applied to the window is immediately wiped therefrom and an absolute minimum of impairment to vision through the window is insured.

While several embodiments of the instant invention have been closed, the instant invention is not to be limited thereto, since other structural variations embodying the inventive concept will occur to those skilled in the art upon an understanding of the instant disclosure. Accordingly, it is intended that the instant invention be limited solely by the scope of the appended claims.

Having fully disclosed the instant invention, and completely described its mode of operation, what is claimed as new is as follows:

1. A window clearing system comprising a wiper assembly including a wiping element arranged for movement across the surface of a window, fluid applying means carried by said wiper assembly for applying clearing fluid to the surface of a window on opposite sides of said wiping element, means for supplying clearing fluid to said fluid applying means, and inertia responsive valve means controlling said fluid applying means and operable automatically upon reversal of movement of said wiper assembly for causing fluid to be applied only in advance of said wiping element as the latter moves across the surface of a window.

2. A vehicle window clearing system comprising a wiper assembly including a wiping element arranged for oscillatory movement across the surface of a window, fluid discharge means carried by said wiper assembly and including nozzle means directed toward the window surface at points on opposite sides of said wiping element, clearing fluid supply means communicating with said fluid discharge means, and inertia responsive means operable automatically upon reversal of movement of said wiper assembly to cause fluid to be discharged only through the nozzle means directed forwardly of said wiping element along its direction of movement.

3. A vehicle windshield clearing system comprising a wiper assembly including a wiping element mounted for oscillation across the surface of a windshield, clearing liquid dispensing means including outlet means carried by said wiper assembly and directed toward the windshield at opposite sides of said wiping element, and inertia responsive valve means automatically operable upon reversal in the direction of movement of said wiper assembly to open the outlet means directed forwardly of said wiping element and close the remaining outlet means.

4. A vehicle window clearing system comprising a wiper assembly including a wiping element arranged for oscillation across the surface of a window, fluid discharge means carried by said wiper assembly and including outlet means directed toward the window at opposite sides of said wiping element, said outlet means being directed away from said wiping element sufficiently to insure the application of fluid to points on the window before said wiping element reaches said points, fluid supply means communicating with said fluid discharge means, and inertia responsive valve means automatically operable upon reversal of wiper assembly movement for causing fluid to be dispensed forwardly only of said wiping element.

5. A window clearing system comprising a wiper actuating arm, a wiper blade carried by said wiper actuating arm adjacent one end thereof for movement thereby across the surface of a window, drive means connected to said wiper actuating arm adjacent the other end thereof for imparting motion thereto and therethrough to said wiper blade, fluid discharge means carried by said wiper actuating arm and including fluid outlet means directed laterally outwardly from said wiper actuating arm to a window surface on opposite sides of said wiper blade, means for delivering clearing fluid to said fluid discharge means, and control valve means automatically operable upon movement of said blade across the window surface to close the outlet means directed rearwardly of said blade and to open the outlet means directed forwardly thereof.

6. A vehicle window clearing system comprising a wiping element, a wiper arm mounting said wiping element for oscillating movement across the surface of a window, drive means connected to said wiper arm, fluid dispensing means carried by said wiper arm, means for delivering fluid to said fluid dispensing means, said fluid dispensing means including outlet means for applying fluid to the window on opposite sides of said wiping element, and inertia responsive valve means automatically operable upon wiper arm reversal to cause fluid to be applied only in advance of said wiping element as the latter is oscillated across the surface of the window.

7. A vehicle window clearing system including an arm mounted to overlie a window, drive means connected to said arm to move the same over the window in a predetermined path, fluid discharge means carried by said arm and including outlet means directed laterally outwardly from each side of said arm and downwardly toward the window, means including a source of fluid supply for delivering fluid to said fluid discharge means, and valve means automatically operable by inertia upon arm reversal at each end of said predetermined path to open the outlet means directed forwardly of said arm and close the other outlet means.

8. A vehicle window clearing system comprising a wiper assembly including a wiping element, fluid discharge nozzle means carried by said wiper assembly and including outlet means directed toward the window on opposite sides of said wiping element, said nozzle means having a fluid chamber communicating with said outlet means through valve seats, means including fluid supply means communicating with said fluid chamber to deliver fluid thereto, and valve means responsive to inertia upon reversal of movement of said wiper assembly to alternately open and close said outlet means and cause fluid to be directed to the window only in advance of said wiping element.

9. A vehicle window clearing system comprising a wiper assembly including a wiping element, fluid discharge nozzle means carried by said wiper assembly and including outlet means directed toward the window on opposite sides of said wiping element, said nozzle means having a fluid chamber communicating with said outlet means through valve seats, means including fluid supply means communicating with said fluid chamber to deliver fluid thereto, and valve means responsive to inertia upon reversal of movement of said wiper assembly to alternately open and close said outlet means and cause fluid to be directed to the window only in advance of said wiping element, said valve means comprising a ball type valve movable by reason of its inertia and gravitational position from one valve seat to another upon reversal of movement of said wiper assembly.

10. A vehicle window clearing system comprising a wiper assembly including a wiping element, fluid discharge nozzle means carried by said wiper assembly and including outlet means directed toward the window on opposite sides of said wiping element, said nozzle means having a fluid chamber communicating with said outlet means through valve seats, means including fluid supply means communicating with said fluid chamber to deliver fluid thereto, and valve means responsive to inertia upon reversal of movement of said wiper assembly to alternately open and close said outlet means and cause fluid to be directed to the window only in advance of said wiping element, said valve means comprising a ball type valve movable by reason of its inertia and gravitational position from one valve seat to another upon reversal of movement of said wiper assembly and said fluid chamber having an outer wall confining said ball valve against movement outwardly from either of said valve seats under the influence of centrifugal force.

11. In combination with a vehicle, a window clearing system comprising a wiper arm mounted at its inner end on said vehicle and carrying a wiping element at its outer end, drive means connected to said wiper arm for oscillating said wiping element across the surface of a window, said wiper arm comprising an inner section and an outer section pivoted thereto for inertia induced movement relative thereto, stop means limiting such movement of said outer section, fluid discharge means carried by said inner section and including outlet means directed toward the window on opposite sides of said wiping element, and valve means movable with said outer section to alternately open and close said outlet means, whereby the inertia of said outer section and said wiping element upon reversal of said wiper arm will cause said valve means to open the outlet means directed forwardly of said wiping element and close the other outlet means.

12. A window clearing system comprising a wiping element, an actuating arm adapted for connection to an oscillatory drive for being driven thereby and mounting said wiping element for movement thereof by said arm back and forth across the surface of an associated window, fluid discharge means carried by said wiper arm adjacent the connection thereof with said wiping element, said fluid discharge means including outlet means directed outwardly from each side of said arm toward points spaced from said wiping element, fluid conduit means extending along said wiper arm from said fluid discharge means for connection to a source of fluid supply, said wiper arm having side wall portions serving to conceal and protect said conduit means, and means operable to cause fluid to be discharged from said discharge means only in front of the moving wiping element.

13. A window clearing system comprising a wiping element, a wiper arm mounting said wiping element for movement back and forth across the surface of a window, fluid discharge means carried by said wiper arm adjacent the connection thereof with said wiping element, said fluid discharge means including outlet means directed outwardly from each side of said arm toward points spaced from said wiping element, and fluid conduit means extending along said wiper arm from said fluid discharge means for connection to a source of fluid supply, said wiper arm having side wall portions serving to conceal and protect said conduit means, and inertia responsive valve means operable upon wiper arm reversal to cause fluid to be discharged only through the outlet means directed forwardly of said wiping element.

14. A system for clearing the surface of a window comprising, a wiping element, an arm mounting said wiping element for oscillatory movement across the window surface, fluid discharge means carried by said arm adjacent the inner end of said wiping element, fluid delivery means communicating with said discharge means, said discharge means including outlet means directed toward the window surface at opposite sides of said wiping element and toward the outer end of said wiping element, and inertia responsive valve means automatically operable upon reversal of said arm to open the outlet means directed forwardly of said wiping element and close the other outlet means.

15. A vehicle window clearing system comprising a wiper arm, a wiping element carried by said wiper arm for oscillating movement across the surface of an associated window, nozzle means carried by said wiper arm adjacent the outer end thereof and including outlet means directed toward the surface of the window on opposite sides of said wiping element, at least one of said outlet means being directed toward the outer end of said wiping element and at least one other thereof being directed toward the inner end of said wiping element, means for supplying fluid to said nozzle means, and control means operable to cause fluid to be delivered through said outlet means only in front of the moving wiping element.

16. A vehicle window clearing system comprising a wiper arm, a wiping element carried by said wiper arm for oscillating movement across the surface of a window, nozzle means carried by said wiper arm adjacent the outer end thereof and including outlet means directed toward the surface of the window on opposite sides of said wiping element, at least one of said outlet means being directed toward the outer end of said wiping element and at least one other thereof being directed toward the inner end of said wiping element, means for supplying fluid to said nozzle means, and inertia responsive valve means automatically operable upon reversal of wiper arm movement to cause fluid to be discharged only through the outlet means directed forwardly of said wiping element.

17. A window clearing system comprising a wiper arm, a wiping element carried adjacent one end of said wiper arm for oscillating movement across the surface of a window, fluid discharge means formed integral with said arm and including outlet means directed to opposite sides of said wiping element, means for selectively delivering fluid to said discharge means, and inertia responsive valve means operable to cause fluid to be discharged only through the outlet means directed forwardly of said wiping element.

18. A vehicle window clearing system comprising a wiper arm, a wiping element carried by said arm, drive means connected to said wiper arm for oscillating said wiping element across the surface of a window, fluid applying means carried by said wiper arm and including outlet means directed toward the surface of the window at opposite sides of said wiping element, a source of clearing fluid, means including a manually controlled fluid actuated pump operable to feed fluid from said source to said applying means, and inertia-responsive means automatically operable upon reversal of said wiper arm to open the outlet means directed forwardly of said wiping element and to close the other outlet means.

19. A window clearing system comprising a wiper assembly including a wiping element, means for moving said wiping element back and forth on a window surface, fluid applying means carried by said wiper assembly and arranged to direct clearing fluid onto a window surface on opposite sides of said wiping element, inertia responsive valve means associated with said fluid applying means operable to cause clearing fluid to be applied to a window only forwardly of said wiping element, a source of clearing fluid, and means for delivering clearing fluid from said source to said applying means.

20. A fluid discharge wiper arm comprising, arm means adapted for connection to drive means, fluid discharge means carried by said arm means and including fluid inlet means adapted for communication with a source of fluid supply, fluid outlet means adapted to communicate with said fluid inlet means and directed laterally outwardly of said arm means from opposite sides thereof, and inertia responsive valve means automatically operable upon reversal of wiper arm movement to close the outlet means directed rearwardly of said arm means and open the outlet means directed forwardly thereof.

21. A fluid discharge wiper actuating arm comprising, arm means adapted adjacent one end thereof for connection to drive means for being oscillated thereby and adapted adjacent the other end thereof for connection to a wiping element for oscillating the same across the surface of a window, and fluid discharge means carried by said arm means, said fluid discharge means including fluid inlet means adapted for communication with a source of fluid supply, fluid outlet means arranged for communication with said fluid inlet means and directed laterally outwardly of said arm means, and inertia responsive valve means automatically operable upon reversal of wiper arm movement to alternately open and close said fluid outlet means.

22. A fluid discharge wiper actuating arm comprising, elongated arm means adapted for connection to drive means for being oscillated thereby, fluid discharge means carried by said arm means and including fluid inlet means adapted for communication with a source of fluid supply, a fluid outlet adapted to communicate with said fluid inlet means and directed laterally outwardly of said arm means, and inertia responsive valve means automatically operable upon reversal of wiper arm movement to alternately open and close said fluid outlet.

23. A vehicle window wiper actuating arm comprising an inner arm section adapted for connection to drive means for being oscillated thereby and an outer arm section pivoted to said inner section for inertia induced movement relative thereto and adapted to carry a wiping element, stop means limiting such movement of said outer section relative to said inner section, fluid discharge means carried by said inner section and including outlet means directed laterally outwardly toward a window surface from opposite sides of said arm, and valve means movable with said outer section to alternately open and close said outlet means, whereby the inertia of said outer section and of a wiping element carried thereby upon reversal of said wiper arm will cause said valve means to open the outlet means directed forwardly of the wiping element and close the other outlet means.

24. A fluid discharge wiper actuating arm comprising, an elongated drive arm adapted for connection to a drive mechanism for moving a wiper element across the surface of an associated window, fluid discharge means carried by said arm and including fluid inlet means adapted for communication with a source of fluid supply and fluid outlet means arranged for communication with said inlet means and directed laterally outwardly from opposite sides of said arm, and control valve means automatically operable upon movement of said arm over an associated window surface to close the outlet means directed rearwardly of said arm and to open the outlet means directed forwardly thereof.

25. A window clearing system comprising, a wiping element, an actuating arm adapted for connection to said wiping element and to a drive mechanism for moving said wiping element across the surface of an associated window, fluid discharge means carried by said actuating arm and including fluid outlet means adapted for communication with a source of fluid supply and directed laterally outwardly from opposite sides of said arm for applying clearing fluid to a window surface on opposite sides of said wiping element, and control valve means automatically operable in response to drag forces on said wiping element as it moves across an associated window surface for causing fluid to be applied only in advance of said wiping element as it moves across such window surface.

26. A vehicle window wiper actuating arm comprising, a first arm section adapted for connection to drive means for movement thereby and a second arm section adapted to carry a wiping element, said second section being mounted on said first section for movement relative thereto in response to drag forces on a wiping element carried by said second section as it moves across the surface of an associated window, stop means limiting such movement of said second section relative to said first section, fluid discharge means carried by said first section and including outlet means directed laterally outwardly from opposite sides of said arm, and valve means movable with said second section to alternately open and close said outlet means, whereby the drag forces on a wiping element carried by said second section will cause said valve means to open the outlet means directed forwardly of the moving arm and to close the other outlet means.

References Cited in the file of this patent

UNITED STATES PATENTS

| | | |
|---|---|---|
| 1,801,373 | Stevens | Apr. 21, 1931 |
| 2,142,056 | Horton | Dec. 27, 1938 |
| 2,333,854 | Fuller | Nov. 9, 1943 |
| 2,348,502 | Smulski | May 9, 1944 |
| 2,432,690 | Smulski | Dec. 16, 1947 |
| 2,562,819 | Rappl | July 31, 1951 |
| 2,582,717 | Pierce | Jan. 14, 1952 |
| 2,648,865 | Gordon et al. | May 18, 1953 |